Patented Aug. 12, 1941

2,251,988

UNITED STATES PATENT OFFICE 2,251,988

METHOD OF PURGING THE INTERNAL PARTS OF INTERNAL COMBUSTION ENGINES

Alton F. Curran, Malden, Mass.

No Drawing. Application March 30, 1938, Serial No. 199,049

2 Claims. (Cl. 123—198)

This invention relates to a method of purging the internal parts of internal combustion engines, for instance, such internal parts as the piston and/or compression rings, the valves and associated mechanism, the pistons, the walls of the combustion chambers, etc. More specifically, it deals with the removal from such parts of tarry and/or gummy or other substances that tend to deposit and accumulate thereon during the operation of the engine and to detract from the smoothness of operation and efficiency of the engine.

It is well known that in operating internal combustion engines, such as automobile engines, the combustion of the carbureted gasoline or equivalent fuel used in such engines is attended by the deposition of more or less carbonaceous tar, gummy residues, dirt, and other contaminations on engine parts exposed to the burned fuel vapors. Moreover, more or less lubricating or crankcase oil is apt to work its way in between the piston and/or combustion rings and, when the rings are worn, into the combustion chambers, in consequence of which the piston rings and/or walls of the combustion chambers may become fouled with the carbonaceous residues incident to the "cracking" or heat-decomposition of such oil. The fouling or contamination of the various engine parts indicated with the solid residues of the fuel combustion products and/or "cracked" lubricating oil is cumulative in the course of operation of the engine; and the smoothness of operation and efficiency of the engine progressively deteriorates in the course of its operation and may become so serious as to require dismantling of the fouled engine parts and their cleansing by expensive manual operations.

The present invention does away with the need of engine disassembly in purging or cleansing such parts thereof as have been impaired in their function by reason of the accumulation thereon of the various solid residues from the burned engine fuel and/or "cracked" lubricating or crank-case oil. Indeed, the present invention enables the purging or cleansing of the fouled engine parts rapidly and inexpensively while the engine is in its normal assembled condition. The engine-purging method hereof may even be performed with very little exertion by an unskilled person, for instance, by an automobile owner himself, since the composition hereof used as the purging or cleansing medium is virtually foolproof in the sense that it can do no injury to the engine and can be readily introduced into the engine through readily accessible engine mechanism, as will hereinafter appear.

In accordance with the present invention, a liquid composition is introduced, preferably by way of the air-intake opening of the engine carburetor or the air-intake manifold of the engine, into the combustion chambers of the engine in appropriately preheated condition and, by the heat of the engine, is caused to furnish a vapor phase that is extremely effective in penetrating, softening, and dissolving the various contaminations present on the engine parts and that condenses, upon cooling of the engine, to flush or wash the dissolved contaminations into the engine crank-case. More specifically, the liquid composition used for the purposes hereof includes as its primary or essential ingredient a vaporizable aromatic liquid hydrocarbon, preferably falling into the category of benzol, toluol, and xylol, high-flash coal tar naphtha, or a mixture of such liquid hydrocarbons, any and all of which are extremely effective as solvents of the carbonaceous tar, gummy residues, or other solid contaminations accumulating on the engine parts as a result of the combustion of gasoline or equivalent fuel and/or of the "cracking" of the lubricating or crank-case oil. Along with the volatile aromatic hydrocarbon, it is distinctly preferable pursuant to the present invention to use a subordinate proportion of a liquid aliphatic alcohol, ketone, or ether of appreciably higher boiling point than the volatile aromatic liquid hydrocarbon. Not only are the alcohols, ketones, and ethers of the character indicated also highly effective as solvents of the various contaminations present on the engine parts, especially when such impurities are in a caked, gummed, or oxidized condition, and thus supplement the penetrating and dissolving action of the volatile aromatic liquid hydrocarbon but, after vaporization, along with the liquid hydrocarbon in the hot combustion chambers, they condense selectively before the condensation of the lower-boiling point liquid hydrocarbon and thus soften, dissolve, and condition the contaminations sufficiently so that upon subsequent condensation of the liquid hydrocarbon vapors, flushing or washing of the parts with the liquid hydrocarbon condensate is attended by a substantially complete or perfect purging or cleansing of the engine parts. The composition hereof is introduced, preferably by way of the air-intake or intake-manifold of the engine carburetor, in its normally liquid condition into the preheated engine while the engine is still running. As is to be expected, therefore, the engine is "drowned" or stalled and cannot be started until the purging or cleansing treatment hereinbefore described has been completed, that is, until the engine has cooled sufficiently to result in the condensation of the composition hereof and its gravitation along with the contaminations dissolved therein into the engine crank-case. Inasmuch as practically all of the lubricating oil is also flushed into the crank case by the composition hereof along with the dissolved contaminations, it is desirable that the composition itself furnish or supply lubricant to the combustion-chamber walls so as to avoid possible injury to the latter when operation of the engine is resumed. Accordingly, the composition hereof as introduced into the engine preferably also contains a substantial amount of suitable lubricating oil, for instance, a high-grade mineral lubricating oil of appropriate viscosity.

There are various compositions that may be used satisfactorily pursuant to the instant invention as the purging medium for the fouled engine parts. While not restricted thereto, I shall for purpose of illustration cite a composition that has been found to be highly satisfactory on a wide commercial scale for purging the fouled engine parts of any and all makes of automobile or equivalent internal combustion engine. Specifically, such composition contains xylol as the vaporizable aromatic liquid hydrocarbon, diacetone alcohol as the higher boiling point aliphatic liquid alcohol, and a mineral lubricating oil of appropriate viscosity and resistance to oxidation or gum formation. Xylol is excellent for the purposes hereof in that its boiling point (142° C.) is sufficiently high to obviate explosion hazard and yet is sufficiently low to enable its substantially instantaneous and complete vaporization upon introduction into a warmed-up and still-running engine. Diacetone alcohol is also admirably adapted for the purposes hereof in that its boiling point (155° C.) is substantially higher than that of the xylol and in that, upon selective condensation in the combustion chambers, it acts quickly to penetrate, soften, and dissolve even those accumulated impurities, such as oxidized gums or similar residues, which are only slowly soluble in the later-condensing xylol vapors. Generally speaking, it is preferable that the composition contain far more xylol than diacetone alcohol, say, about 4 to 8 times as much by weight of the xylol as the diacetone alcohol. The lubricating oil may be present in the composition hereof in amount substantially equal to the xylol or in amount somewhat greater or less than that of the xylol. A commercial composition answering the purposes hereof may advantageously comprise by weight about 50% of the xylol, about 10% of the diacetone alcohol, and about 40% of the mineral lubricating oil, which latter may be of a Saybolt viscosity at 100° F. of about 75 to 85. It is to be noted that the various ingredients of the composition hereof are compatible or miscible in any and all proportions so that the finished composition may be shipped in drums or containers to the consumer without any separating or settling tendency therein and without need for stirring the composition preparatory to its use. The composition is prepared simply by admixing its various components at ordinary or room temperature until the desired physically homogeneous liquid mixture or blend is realized. The composition does not tend to deteriorate or spoil on long-standing under various climatic conditions. Indeed, the composition hereof is so stable that it does not tend to decompose in contact with the hot engine parts even in the presence of moisture; and it is entirely free from potentially acid-forming components or elements such as are apt to be liberated at least in small amount from organic esters, halogenated hydrocarbons, or the like, especially in the presence of moisture, and such as would tend to etch or corrode engine parts, especially under heat.

In introducing the composition hereof into an automobile or equivalent internal combustion engine, the procedure is to warm up the engine by running it for an appropriate period of time, for instance, until the engine attains normal operating temperature which, in the case of a water-cooled automobile engine, may be that corresponding to a temperature of about 140° to 180° F. in the cooling water. With the engine in warmed-up condition and idling at a brisk pace, say, equivalent to a road-speed of about 25 to 35 miles an hour, the liquid composition hereof is gradually poured into the air-intake of the engine carburetor in the amount of, say, about a quart. As pouring continues, the engine commences to sputter and slow down and as this occurs, the pouring is increased to such a rapid rate that the entire quart of the composition is dispensed into the engine by the time the engine has been completely "drowned" or stalled. Within the hot combustion chambers into which the composition hereof has been sucked by the operation of the engine, the xylol and diacetone alcohol components of the composition hereof are immediately and practically completely transformed into a vapor phase by virtue of their contact with metal parts at temperatures far exceeding their boiling points and of a heat content far greater than that necessary to effect the vaporization of all such components. The vapors thus generated in copious quantities diffuse throughout the combustion chambers and exert a softening and solvent action on the contaminations present on the various surfaces, including the surfaces of piston rings, valves and associated mechanism, combustion chamber walls, etc. on which carbonaceous tars and/or gummy residues, or other contaminations may have accumulated as a result of past operation of the engine. After a short while, the diacetone alcohol vapor condenses on these various surfaces and the resulting condensate further softens, dissolves, and conditions the accumulated tars, gums, and other contaminations for immediate and complete scavenging or removal by the later-condensing xylol vapor which, as its dew point is reached on further cooling of the engine, condenses progressively to form condensate that trickles progressively over the already-conditioned or largely dissolved tars, gums, and other contaminations and, in gravitating over the combustion chamber walls past the piston rings, washes such contaminations as a fluent solution into the engine crank case while leaving the desired film of lubricant or lubricating oil on the combustion chamber walls. The remotest fouled parts or surfaces of the engine are thereby purged of contaminations, which are flushed or washed into the crank-case oil. In a short period of time, say, about 15 to 30 minutes, the engine is purged and ready to resume operation. However, prior to starting the engine, it is preferable to drain the fouled crank-case oil and to replace it by fresh crank-case oil.

It is thus seen that the engine-purging method hereof is preferably performed at a time when the engine needs a change of crank-case oil, at which time the engine-purging method hereof may be performed just before the change of oil is effected, as by unskilled labor in a garage or gasoline station. Upon change of the crank-case oil, the engine starts without trouble and its improved operation and efficiency is immediately noticeable by the operator, especially when the engine, preparatory to its being purged by the method hereof, has been run for a long while and has been troublesome on account of abnormally low cylinder-compression, noisy valves, low lubricating oil pressure arising from clogged oil lines, overheating, or other faults attributable to fouled or gummed engine parts.

In lieu of the diacetone alcohol component of the composition hereof, it is possible to use various other aliphatic liquid alcohols, ketones, and ethers, provided that they have boiling points appreciably higher than that of xylol and can hence undergo selective initial condensation from a vapor phase inclusive of the xylol and hence condition the fouled engine parts for the appropriate period of time before the secondary condensation of xylol vapors ensues and the xylol condensate washes such parts substantially free of their conditioned, softened, or largely dissolved contaminations. Such liquid aliphatic alcohols as xyxyl, heptyl, octyl, etc., such ketones as n-butyl ketone, di-butyl ketone, amyl ketone, iso-amyl ketone, etc., and such ethers as di-amyl ether, heptyl ether, octyl ether, etc., or mixtures of the foregoing organic liquids are serviceable in the liquid composition hereof in lieu of its diacetone alcohol component, which latter component is, however, considered at the present time to be preferable for the purposes hereof because of its high effectiveness, low cost, and very satisfactory boiling point, namely, a boiling point such as is consonant with selective condensation of the vapors thereof in the combustion chambers so timed in its relationship to subsequent condensation of the xylol vapors as to assure its being present in adequate amount as a conditioning, softening, and solvent agency in the tarry and gummy contaminant films when the xylol vapors are condensing on such films and the xylol condensate progressively trickles over and washes such films. It might be remarked that, as the mixed xylol and diacetone alcohol condensates containing the dissolved contaminations therein gravitate to the crank case of the engine, it also purges the crank-case parts and walls, which may have to some extent also been fouled in much the same way as the engine parts immediately above the pistons. Of course, the crank-case parts and walls are very largely at a much lower temperature than the combustion-chamber walls or engine parts exposed directly to the combustion of the gasoline or equivalent fuel in the combustion chambers immediately above the pistons; and the contaminations on the crank-case parts and walls are not so refractory, nor are they so seriously detractive of the smooth operation and efficiency of the engine, as are the contaminations on the combustion-chamber walls or engine parts immediately above the pistons.

It is to be understood that the invention hereof might be embodied in other than the specific method and/or compositions hereinbefore described and that the invention hereof as defined by the appended claims should be construed as broadly as the prior art permits.

I claim:

1. A method of purging the internal parts of an internal combustion engine of accumulated contaminations incident to the past operation of the engine, said engine being equipped with an air-intake leading to the combustion chambers of said engine and with a crank case containing lubricating oil for said engine, which comprises gradually pouring into the air-intake of said engine, while said engine is running at a brisk pace and is sufficiently hot to correspond to a temperature of at least about 140° F. in a water-jacket surrounding said engine, a substantially homogeneous liquid composition composed essentially of a preponderant proportion of xylol, a subordinate proportion of diacetone alcohol, and a substantial proportion of mineral lubricating oil; the amount of said composition thus poured into said air-intake of said engine being not less than about a quart and said engine running at sufficiently brisk pace to suck substantially said entire amount into said combustion chambers before being "drowned" or stalled, thereby generating in said combustion chambers of said engine copious mixed vapors of said xylol and diacetone alcohol; allowing said engine to cool sufficiently to condense said vapors and thereby enable the resulting condensates to dissolve and carry said contaminations into said engine crank case and leave a film of said oil lubricant on the walls of the combustion chambers for the resumption of normal operation of the engine; and changing the lubricating oil in said engine crank case.

2. A method of purging the internal parts of an internal combustion engine of accumulated contaminations incident to the best operation of the engine, said engine being equipped with an air-intake leading to the combustion chambers of said engine and with a crank case containing lubricating oil for said engine which comprises gradually pouring into the air-intake of said engine while said engine is running at a brisk pace and is sufficiently hot to correspond to a temperature of at least about 140° F. in a water-jacket surrounding said engine, a substantially homogeneous liquid composition composed essentially of a preponderant proportion of a vaporizable aromatic normally liquid hydrocarbon selected from a class consisting of benzol, toluol, xylol, and high-flash coal tar naphtha, a subordinate proportion of diacetone alcohol, and a substantial proportion of mineral lubricating oil; the amount of said composition thus poured into said air-intake of said engine being not less than about a quart and said engine running at sufficiently brisk pace to suck substantially said entire amount into said combustion chambers before being "drowned" or stalled, thereby generating in said combustion chambers of said engine copious mixed vapors of said hydrocarbon and diacetone alcohol; allowing said engine to cool sufficiently to condense said vapors and thereby enable the resulting condensates to dissolve and carry away said contaminations into said engine crank case and leave a film of said lubricating oil on the walls of the combustion chambers for the resumption of normal operation of the engine; and changing the lubricating oil in said engine crank case.

ALTON F. CURRAN.